United States Patent [19]

Bell et al.

[11] Patent Number: 4,564,290

[45] Date of Patent: Jan. 14, 1986

[54] APPARATUS FOR DETERMINING IMAGE AREAS FROM FILMS AND PLATES

[75] Inventors: David D. Bell; Gary A. Dobson, both of Westerly, R.I.

[73] Assignee: Harris Graphics Corporation, Melbourne, Fla.

[21] Appl. No.: 430,886

[22] Filed: Sep. 30, 1982

[51] Int. Cl.[4] ...................... G01N 21/17; G01B 11/28

[52] U.S. Cl. ...................................... 356/73; 356/380; 356/444; 356/446

[58] Field of Search ....................... 250/559, 571, 563; 356/73, 432, 429, 443, 444, 446, 380, 430, 431, 445

[56] References Cited

U.S. PATENT DOCUMENTS

| | | | |
|---|---|---|---|
| 3,053,181 | 10/1958 | Jorgensen | 250/559 |
| 3,936,189 | 2/1976 | De Remigis | 356/73 |
| 4,125,328 | 11/1978 | Suga | 356/73 |
| 4,162,126 | 7/1979 | Nakagawa et al. | 356/446 |
| 4,210,818 | 7/1980 | Green et al. | 356/444 |
| 4,441,819 | 4/1984 | Takeuchi et al. | 356/380 |

*Primary Examiner*—Vincent P. McGraw
*Assistant Examiner*—S. A. Turner
*Attorney, Agent, or Firm*—Yount & Tarolli

[57] ABSTRACT

A scanning apparatus is provided capable of obtaining image area information from both photograhic films and printing plates. The apparatus includes a scanner assembly carrying two independent light sources for use in the respective plate and film scan operations. The scanner assembly is mounted for movement over a film/plate support surface and carries a columnar sensor array positioned to receive light transmitted through films being scanned. The same sensor array is utilized for receiving light reflected from plates when in the plate scan mode. Optical baffle members are operated by a manual control knob which also controls energization of the appropriate light sources.

4 Claims, 8 Drawing Figures

APPARATUS FOR DETERMINING IMAGE AREAS FROM FILMS AND PLATES

BACKGROUND OF THE INVENTION

The present invention is generally related to systems for providing information for use in determining the ink requirements for a printing press. More particularly, the present invention is directed to an apparatus for analyzing an image member, such as a photographic film or lithographic plate which bears an image to be printed and provides output information representative of the image area.

In many printing processes, particularly offset printing, the thickness of ink film applied to a printing member, such as a lithographic plate, is controlled by regulating the quantity of ink in each of a plurality of adjacent columns on the service of the printing member. In many cases, the quantity of ink presented to each column is controlled by a deformable blade or other means which is spaced at an adjusted distance from an inking roll by means of adjustable keys or other regulating means for each column. In some cases, each column may be supplied with ink by a piston pump which is controlled to vary the amount of ink supplied to each column.

In the past, it has been common to adjust the amount of ink by observing the printed product to determine which columns are receiving too much or too little ink and adjusting the ink keys accordingly. An initial adjustment may be made by merely observing the overall image area with the naked eye and adjusting the ink keys to an approximate setting.

In U.S. Pat. No. 4,180,741 there is disclosed a system for obtaining information on the ink requirements in which a scanner assembly is moved across a photographic film on a transparent support surface. The assembly carries a light source and sensor head including a columnar array of light sensors. The photographic film (positive or negative) represents an image area divisible into a plurality of columns corresponding to adjacent ink key columns. Calibration strips are provided at either or both ends of the transparent support surface to calibrate the light sensors and compensate for variations in film type and thickness. The calibrated and processed data samples for each column to be printed provide image area information for the respective columns. These values may be stored or are utilized immediately as inputs to the printing press to make initial ink key settings.

Although the system disclosed in U.S. Pat. No. 4,180,741 provides several significant advantages over the prior systems for obtaining information for initial ink key settings, it is limited to the scanning of a positive or negative photographic film or the like containing transparent areas, the system could not be utilized for obtaining information from printing plates such as utilized in a lithographic process.

SUMMARY OF THE INVENTION

According to the present invention there is provided a scanning apparatus capable of obtaining image area information from both photographic films and printing plates. A scanner assembly is provided with two independent light sources for use in the respective plate and film scan operations. A first elongated florescent bulb carried by the scanning assembly underlies a transparent film plate support surface. A columnar sensor array on the assembly overlies the support surface to receive light transmitted through films when scanned. The same sensor array is utilized for receiving reflected light from plates when in the plate scan mode.

Plate scanning is achieved through the use of a second light source also mounted to the scanner assembly, but overlying the film support surface. The second light source includes a pair of elongated florescent bulbs each mounted on opposite sides of the sensor array and generally parallel thereto. Light from each bulb is directed onto the surface of a plate being scanned through an optical baffle and at an angle to the plate which provides substantially diffuse reflections to the sensor array. The baffle members are mounted for movement by a control mechanism when switching between the plate and film scan modes. This mechanism is effective to lower the baffle members in close proximity to the plate surface when switching to the plate scan mode. In response to this operation, the plate scan light source is energized and a plate normalization detector is enabled. Sensor array calibration is achieved through the use of a detector calibration strip which is placed over the film calibration strips when changing to the plate scan mode.

Accordingly, it is an object of the present invention to provide a scanning apparatus which may be utilized by obtaining print area information from both photographic films and printing plates.

It is a further object to the present invention to provide a combination plate and film scanning apparatus which may be switched between scanning modes with relative ease and in a minimum amount of time.

Another object to the present invention is to provide a combination plate and film scanning apparatus which utilizes the same light sensor array for both modes of operation and which includes means for automatically adjusting the baffle members when shifting between modes.

BRIEF DESCRIPTION OF THE DRAWINGS

The foregoing and other objects and features of the present invention will become more apparent upon consideration of the following description taken in connection with the accompanying drawings, wherein.

DETAILED DESCRIPTION OF INVENTION

Figure 1:
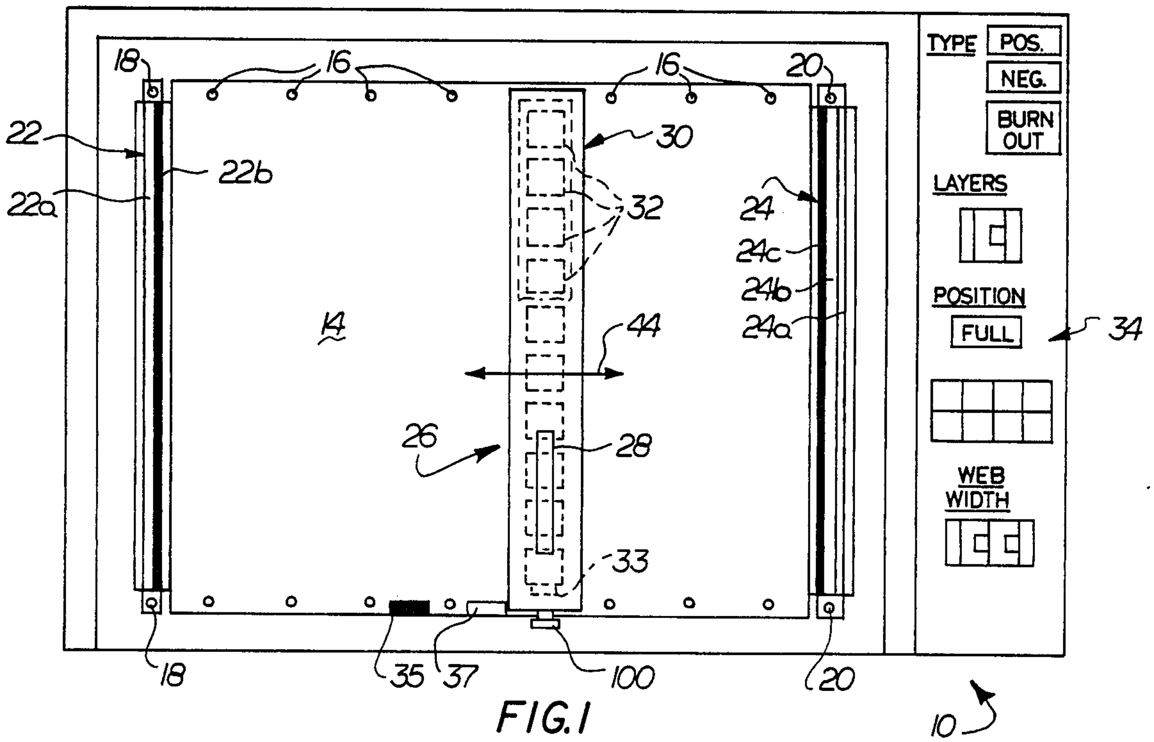
FIG. 1 is a plan view of the scanning apparatus embodying the present invention.

Referring now, more particularly, to FIGS. 1 and 2, the present invention includes a control console generally indicated by the numeral 10, with a transparent support surface 12, preferably of glass, adapted to receive an image member 14 which may be a photographic film or plate as hereinafter described. Such an image member is positioned on all or part of support surface 12 by means of register pins 16 which pass through corresponding holes along the top and/or bottom edge portions of each plate and/or film to be scanned. A film bears a photographic image, negative or positive, corresponding to an image to be printed by the press. Correspondingly, a plate, such as a lithographic plate, bears an image created by etching and other well known processes. When placed on support surface 12, the film or plate is scanned and the outputs therefrom analyzed to determine the areas of image in imaginary columns corresponding to the ink columns on a printing press to which the ink supply is controlled for printing purposes. This is described in more detail in U.S. Pat. No. 4,180,741, which is incorporated herein by reference.

At each end of surface 12 there is provided a pair of mounting pins 18 and 20 at the left and right sides, respectively. The mounting pins hold a film or plate calibration strip in place during the scanning operation hereinafter described. As illustrated in FIG. 1, there is provided a plate calibration strip 22 at the left side of surface 12, while a film calibration strip 24 is illustrated at the right side. This is merely for the sake of simplicity. In actual practice, a detector calibration strip would be mounted at one end of the scanning surface when a plate was being scanned. Similarly, during film scanning the detector calibration strip would be removed and two film calibration strips as illustrated at 24 would be utilized. The purpose of the calibration strips is described in more detail below. Each plate to be scanned would be provided with plate calibration marks 35 and 37 which are sensed by a detector 33.

A scanner assembly 26 is manually moveable with respect to the support surface 12 and the film or plate mounted thereon by means of a handle 28. The scanner assembly carries a sensor head or array 30 located above support surface 12 and including a column of light sensors 32, each of which provides an output signal indicative of the amount of light or other selected radiation which is incident thereon. Console 10 includes a control panel 34 having a number of pushbuttons which is thereon by which an operator may provide information for assistance in analyzing the scan data. The functions and purposes of the various control switches illustrated is described in U.S. Pat. No. 4,180,741 while the preferred embodiment described herein includes these control functions, all such functions would not be necessary for the invention disclosed and claimed herein.

The scanner assembly 26 further includes a radiation source 36, preferably a single elongated florescent bulb, mounted beneath the transparent support surface 12 and moveable with the scanner assembly 26. A collimating shroud 38 is also mounted to the scanner assembly 26 and is disposed between support surface 12 and radiation source 36. Shroud 38 includes an elongated source aperture 40 extending along its lower side and an illumination aperture 42 along its upper side. The purpose of the shroud is to generally collimate light provided from a radiation source 36. The illumination aperture 42 confines the light transmitted through the film, which is then provided to sensors 32, is of the desired width.

Scanner assembly is supported by control console 10 by appropriate means to allow movement back and forth over the support surface as indicated by arrow 44 in FIG. 1. A position potentiometer, not illustrated, is coupled to this support mechanism to provide position signal for the scanner assembly. In addition, a scan switch, not illustrated, is positioned at each limit of travel of the scanner assembly 26. The position potentiometer, scanner switch and mounting mechanism is illustrated in U.S. Pat. No. 4,180,741.

Figure 2:
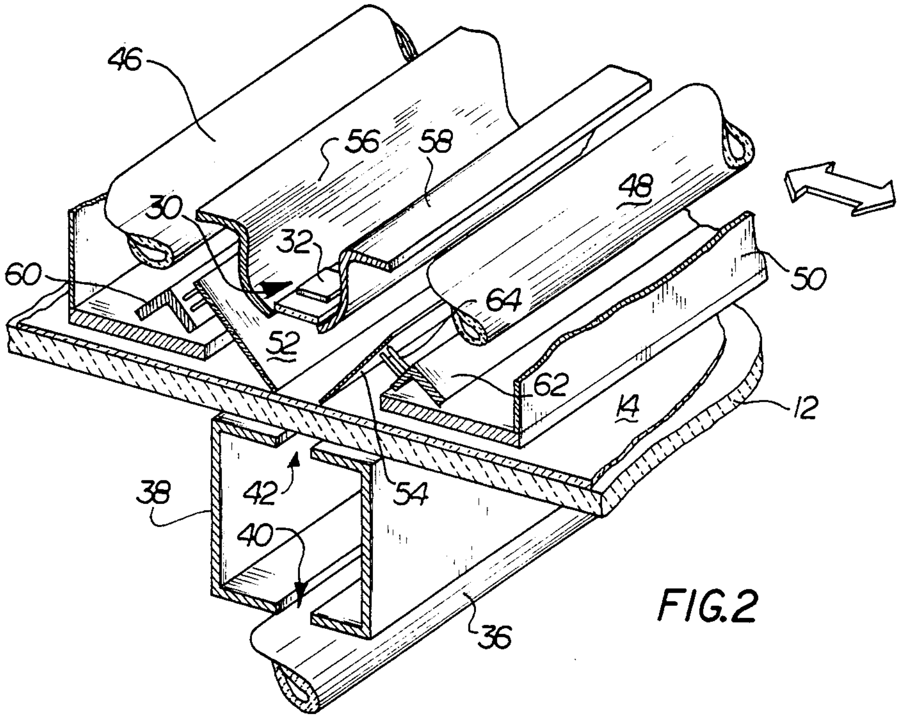
FIG. 2 is a partial perspective view of the scanner assembly with portions removed to show the optical arrangement.

With reference to FIG. 2, it can be seen that the scanner assembly includes a second radiation source comprising a pair of elongated florescent bulbs 46 and 48 mounted above support surface 12 and generally parallel to the sensor array 30. The scanner assembly is also provided with a shield or housing 50 to enclose bulbs 46 and 48 as well as the sensor array 30 and other internal components. The light paths from bulbs 46 and 48 are defined in part by a pair of baffle members 52 and 54, respectively. In addition, a pair of upper shield members 56 and 58 serve to channel the light and define a mounting for the sensor array 30. Baffle members 52 and 54 are mounted to elongated baffle supports 60 and 62 by way of mounting arms illustrated at 64.

Figure 3:
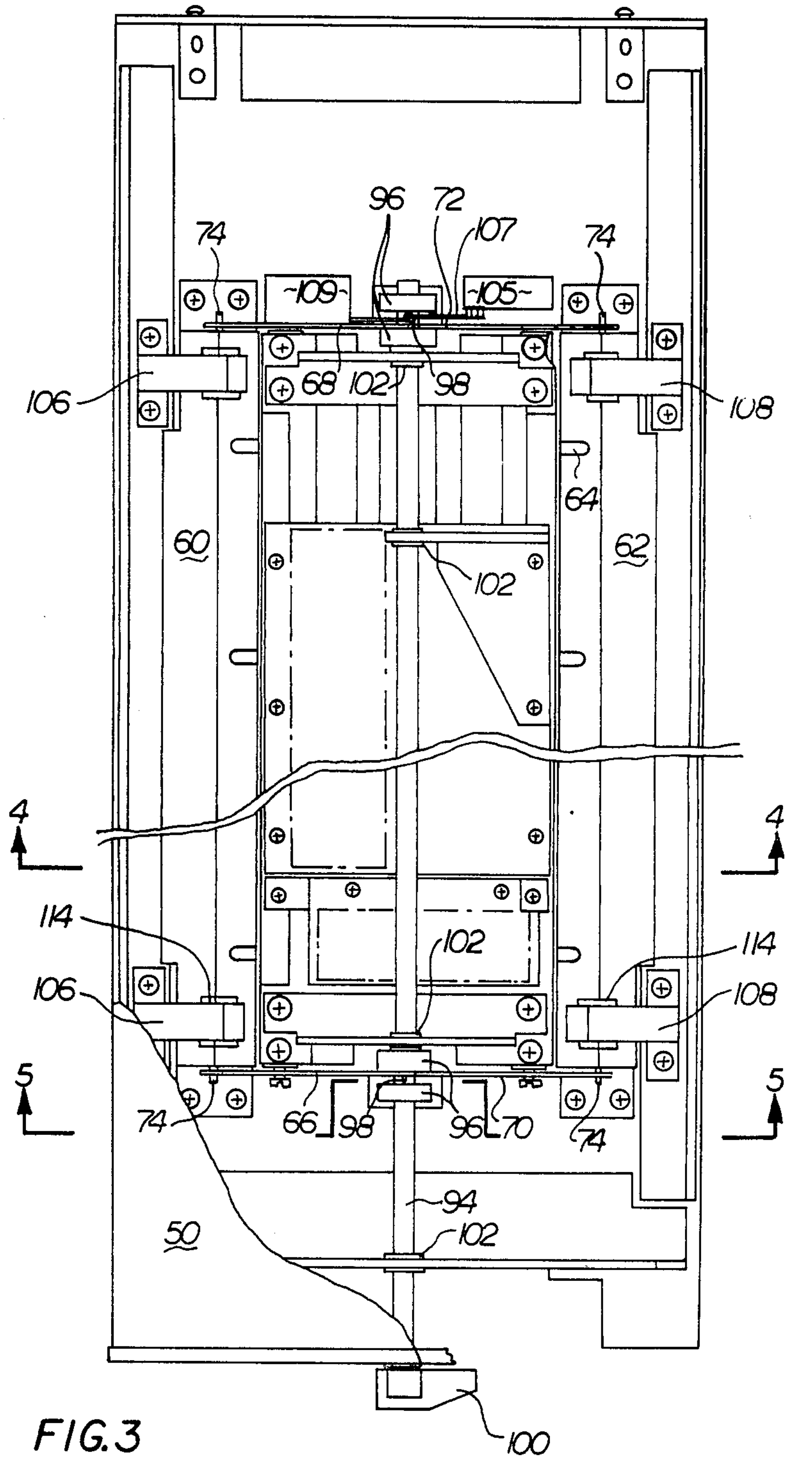
FIG. 3 is a top plan view of the scanner assembly with sections removed.
Figure 4:
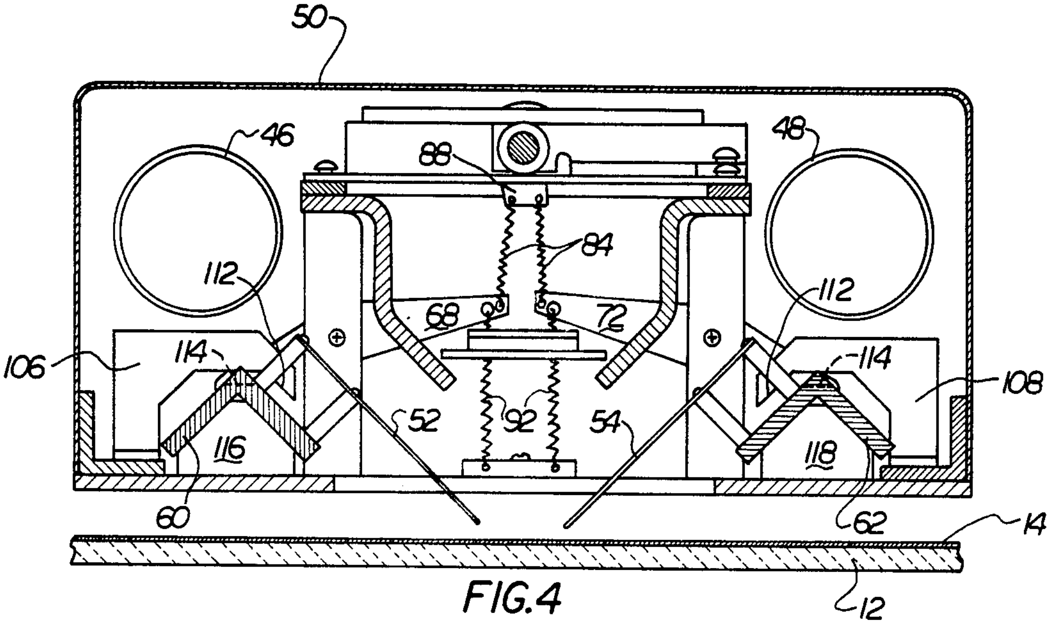
FIG. 4 is a sectional view of the scanner assembly taken along Section 4—4 of FIG. 3.
Figure 5:
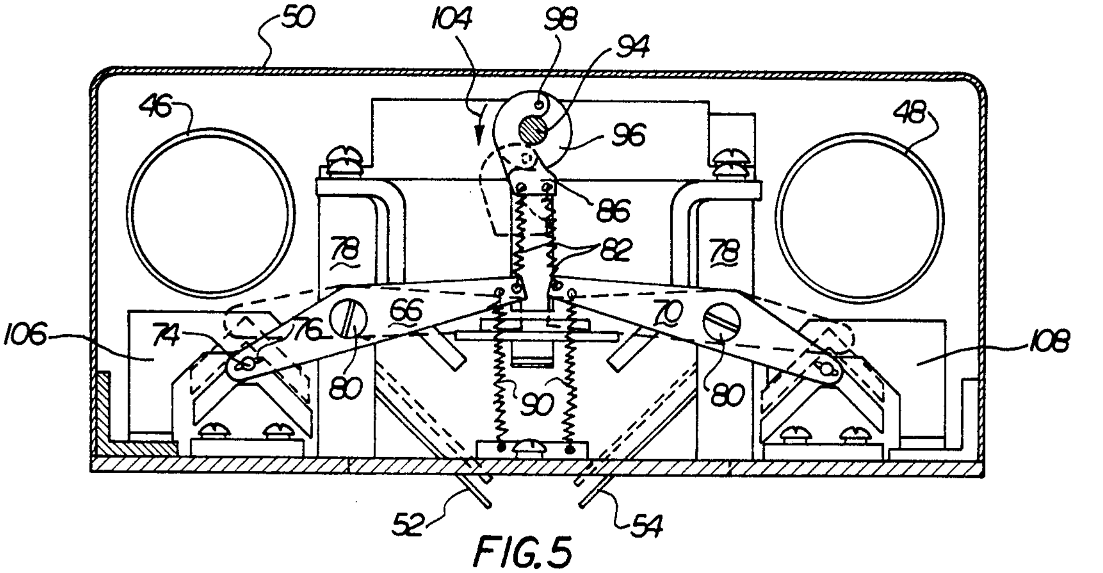
FIG. 5 is a sectional view of the scanner assembly taken along Section 5—5 of FIG. 3 with a phantom view of the elements in the film scan position.
Figure 6A:
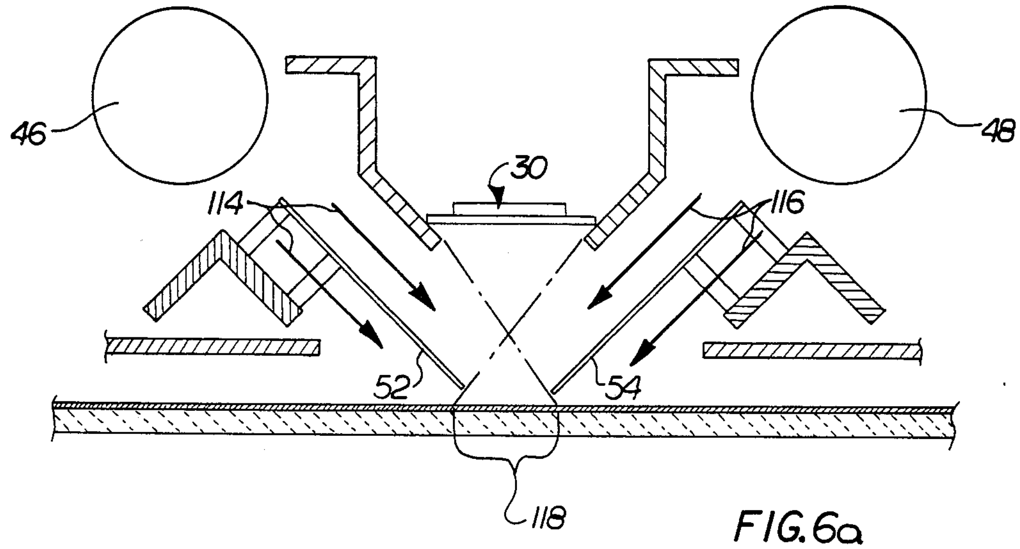
FIGS. 6*a* and 6*b* are simplified diagrammatic illustrations of the optical paths for the plate and film scans modes, respectively.
Figure 6B:
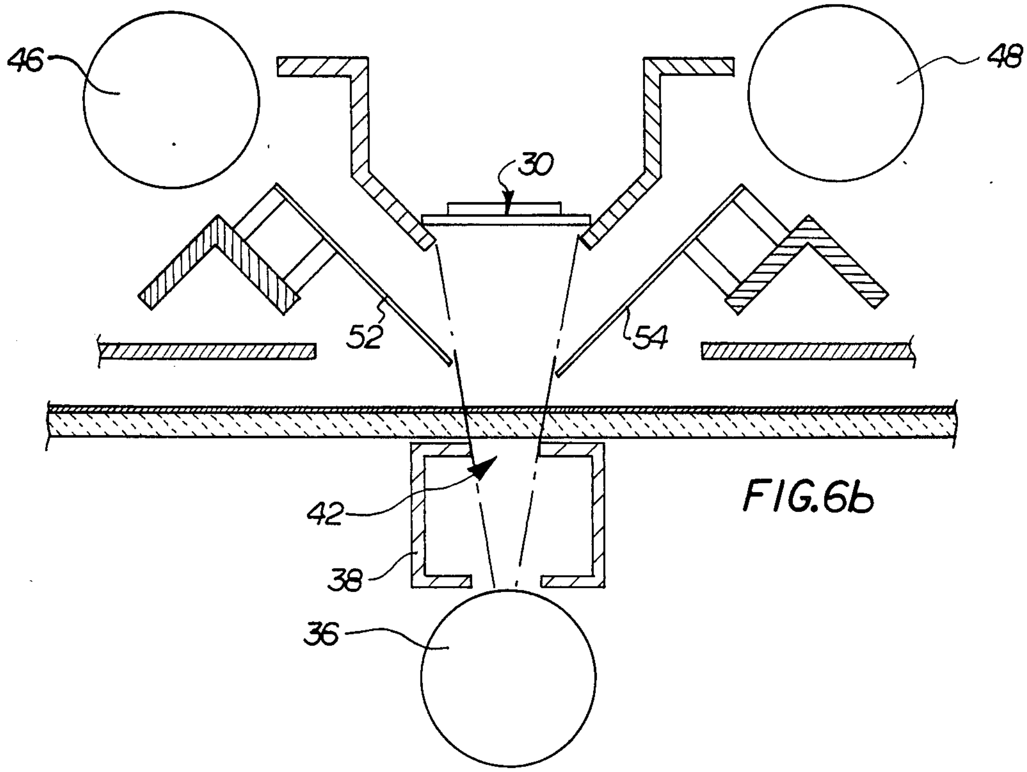

With reference to FIGS. 3–5, it can be seen that the baffle supports 60 and 62 are of angular configuration and are carried by a pair of levers 66, 68, 70 and 72, respectively. This is achieved by way of pins 74 at opposite ends of each baffle support 60 and 62 which cooperate with corresponding slots 76 formed in the end portion of each lever 66, 68, 70 and 72. Each lever is pivotly mounted to a support member 78 by way of mounting screws 80. Levers 66, 68, 70 and 72 are positioned under the control of pairs of positioning springs 82 and 84, the upper ends of which are attached to link members 86 and 88, respectively. Mild biasing of the levers in a downward direction is provided by spring pairs 90 and 92. Link member 86 and 88 each include a curved hook portion which partially surrounds a control shaft 94 when in the plate scanning mode. The upper portion of each link member is disposed between a pair of mounting collars 96, one of which carries a pin or dowel 98. Collars 96 are affixed to the control shaft 94 by way of set screws or other appropriate means for rotation therewith. A control knob 100 is affixed to shaft 94 for manual rotation thereof as hereinafter described. Shaft 94 is rotatably supported by bearings 102.

With particular reference to FIG. 5, it can be seen that links 86 and 88 together with their respective positioning springs 82 and 84 define an over-center mechanism. When shaft 94 is rotated approximately 180 degrees in the counterclockwise direction as indicated by arrow 104, levers 66, 68, 70 and 72 will pivot to the phantom position illustrated in FIG. 5 under the influence of biasing springs 90 and 92. This shifts the baffle supports 60 and 62 in the upward direction and into contact with cantilevered stop members 106 and 108, respectively. These define an upper stop position for each baffle support and its corresponding baffle member. It will be appreciated that each cantilevered stop is provided with a downwardly depending portion at its distal end with a slide surface 112 which is contacted by the oppositely disposed surface of each baffle support during the shifting operation. This influences each baffle member slightly in the outward direction until the surfaces defined by notched portions 114 of the baffle supports seat snuggly against the corresponding horizontal surfaces of the cantilevered supports 106 and 108. Thus, during the shifting operation the baffle supports are moved upwardly and slightly outward to effect proper positioning of the baffle members for operation in the film scan mode.

The scanner assembly is provided with a mode switch 105 mounted toward the rear of the scanner assembly and is operated by way of a crank member 107 including an end portion which extends over pin 98 and is actuated thereby as the baffle support is shifted to the lower or plate scan position illustrated in FIG. 4 by the rotation of the shaft 94 and therefore movement of pin 98. A second switch 109 is mounted in the adjacent area and also activated by the movement of pin 98.

When baffle supports 60 and 62 are in the lower, or plate scan positions they rest on correspondingly shaped stop members 116 and 118 affixed to the bottom of the scanner assembly. This assures a proper positioning of the baffle members for the plate scanning operation. In the preferred embodiment, the lower edges of the baffle members are held at approximately a ¼-inch clearance from the surface of a plate to be scanned. The horizontal spacing between these edges is approximately 0.754 inches for the plate scan mode. When shifting to the film scan mode the lower edges of the baffle members are shifted upward approximately ⅛ inches and horizontally away from each other to provide a spacing of approximately of 0.940 inches. This assures that sufficient light is provided to the sensor array from shroud aperature 42 when operating in the film scan mode.

With reference to FIGS. *6a* and *6b*, the optics associated with the scanning operation may be more fully understood. FIG. *6a* is a simplified illustration of the optical geometry of the scanner assembly when in the plate scan mode. When operating in this mode, the baffle members 52 and 54 are in their lower-most position but spaced slightly from the plate surface in order to avoid contact therewith. Light from bulbs 46 and 48 follows paths generally indicated by arrows 114 and 116, respectively. Thus the lower edges of baffle members 52 and 54 define a window or viewing area 118 on the plate surface during the scanning operation. This provides uniform incident light which is reflected from the plate in the area of window 118 to the sensor array 30.

It will be appreciated that in the preferred embodiment, as illustrated in FIG. *6a*, the relative angular relationship of the baffles and positions of the sensor array and plate surface are such that reflection from the plate surface which reach the sensor array are substantially diffuse in nature. Of course, it will be apparent to those skilled in the art that this geometry may be modified to provide different reflective paths and such modifications or variations are deemed to fall within the scope of the present invention. For example, it may be feasible to achieve satisfactory results utilizing a single light source for the plate scan operation. Also, the particular geometry may result in reflection which is specular in nature yet still provide satisfactory detection.

FIG. *6b* illustrates the optical geometry when the scanner assembly is in the film scan mode. During this operation, bulbs 46 and 48 are de-energized and scanning is achieved with bulb 36 of the lower radiation source. In this mode, the baffle members 52 and 54 are shifted to their retracted positions, defining a larger opening or window than when in the plate scan mode. In the preferred embodiment, the baffle members are retracted to a position which permits all light emanating from the shroud aperature 42 and passing through the film to be received by the sensor array 30. Also, it is feasible to retract baffle members 52 and 54 to a position that would allow the light reaching sensor array 30 to generally equal the light that would reach said array when aperture 42 is of the desired width, even when aperture 42 width is greater than the desired width. Of course, if it was desired to attenuate the sensor array signals slightly for some reason, it is conceivable that one skilled in the art might choose to utilize the baffle members to narrow the optical window by not retracting such to the position illustrated in FIG. *6b*. It will be appreciated that the optical arrangement illustrated in FIGS. *6a* and *6b* provide a relatively simple structure which allows the use of a common array of light sensors for operation in both the plate and film scanning modes. The baffle members provide a means for both maintaining diffuse reflection as well as defining the optical window in the plate scan mode.

Figure 7:
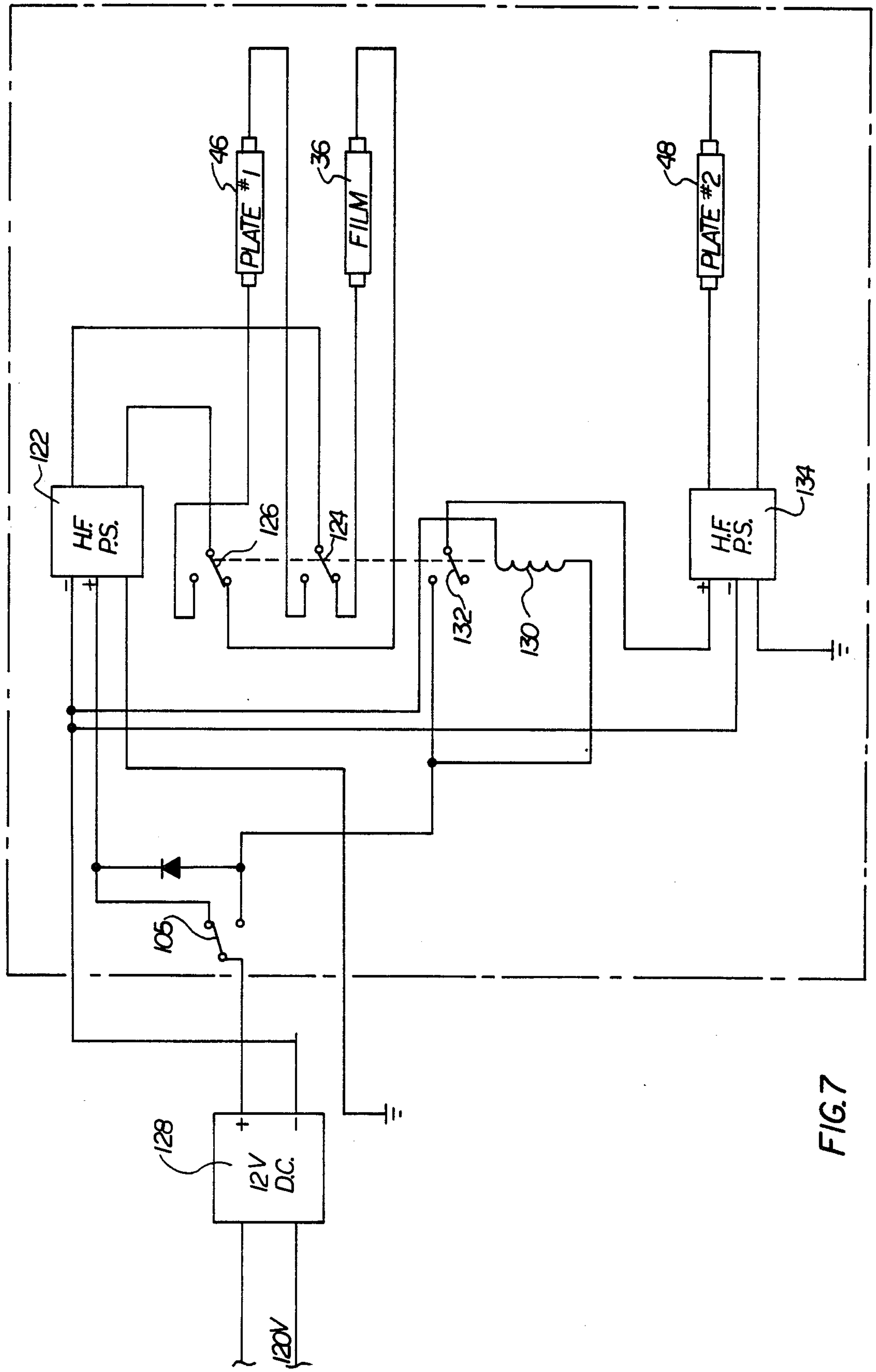
FIG. 7 is a schematic diagram of the control circuitry associated with the present invention.

Referring now, more particularly, to FIG. 7, operation of the control circuitry associated with the present invention may be more clearly understood. This circuitry provides energization of the florescent bulbs associated with the plate and film scan operations. Florescent bulb 36 for the film scan operation is energized through a high frequency power supply 122 through solenoid operated switches 124 and 126. Preferrably power supply 122 includes an inverter which provides an output of 200–300 volts at 20 KHz. The power supply is operated from a 12 volts dc supply 128 connected to a 120 volts ac supply.

When operating in the film scan mode, mode switch 105 is in the position illustrated in FIG. 7 and provides power to the high frequency power supply 122 from the dc source 128. When shifting to the plate scan mode, operation of switch 105 is effective to energize a solenoid coil 130, which in turn operates switch contacts 124 and 126 to their upper positions. It also effects operation of a switch 132 to cause energization of a second high frequency power supply 134 to energize plate scan bulb 48. In addition, plate scan bulb 46 is connected to power supply 122 through closure of switches 124 and 126. During this operation the film scan bulb 36 is de-energized.

Referring back to FIG. 1, the plate and film scan operations may be summarized as follows: For film scanning, a film to be analyzed is positioned on the transparent support surface 12 and held in place by registration pin 16 corresponding film calibration strips 24 are mounted at either the right or left side of the support surface and held in place by mounting pins 20 or 18, the scanner assembly 26 is then moved manually by means of handle 28 from its limit of travel at one side of support surface 12 to its opposite limit of travel. Initial movement of the assembly results in light being transmitted through the transparent support surface 12 alone in calibration area *24a* the base and opaque portions of the calibrating strip *24b* and *24c* are then sensed to provide normalizing data in a manner described in detail in U.S. Pat. No. 4,180,741. Additional description for the purposes of the invention disclosed herein is felt to be unnecessary.

When operating in the plate scan mode, detector calibration strip 22 is mounted at either the left or the right side of the support surface on pins 18 or 20. With the plate scan bulbs 46 and 48 energized, the scanner assembly is utilized to first sense the diffused light from the detector calibration strip and the outputs of sensors 32 are utilized to achieve normalization of the sensors with respect to one another and in a manner as described in U.S. Pat. No. 4,180,741. The printing plate 14 is then scanned and the outputs from sensor array 30 are stored and processed as described in the above-mentioned patent. During this scanning operation, plate calibration detector 33 passes over plate calibration marks 35 and 37. The output from this detector is utilized to provide normalization for variations which occur between plates due to aging and other reasons. Calibration marks 35 and 37 correspond to 100% and 0% values for the particular plate being scanned. In the preferred embodiment, calibration marks 35 and 37 each are 4.75 inches long and are observed by the calibration detector under control of the position signals received from the position potentiometer described in the above-mentioned patent. In the preferred embodiment, each of the plate calibration marks 35 and 37 is strobed four times by the calibration detector 33. The output signals from detector 33 are processed in accordance with the following formulas in order to provide the 0% and 100% values:

$$\text{Calculated zero \% value for sensor}_n = \frac{\dfrac{\sum_{1}^{4} \text{Zero \% reading by plate calibrated detector}}{4} - \text{A/D reading of constant reference strip by sensor}_n}{\text{Reading of constant reference strip by plate calibration detector}}$$

$$\text{Calculated 100\% value for sensor}_n = \frac{\dfrac{\sum_{1}^{4} \text{100\% reading by plate calibration detector}}{4} - \text{A/D reading of constant reference strip by sensor}_n}{\text{Reading of constant reference strip by plate calibration detector}}$$

The plate image area may be expressed in terms of percent coverage for each light sensor in accordance with the following equation:

$$\text{\% Coverage} = \frac{\text{Calculated zero \% value for sensor}_n - \text{A/D reading by sensor}_n}{\text{Calculated zero \% value for sensor}_n - \text{Calculated 100\% value for sensor}_n}$$

where each "$\text{sensor}_n$" corresponds to a light sensor 32.

It will be appreciated from the foregoing description that the scanning apparatus of the present invention provide a unique, yet relatively simple, means for scanning both images from plates and photographic films to provide information relative to a print area coverage of images to be printed. The geometric relationship of the radiation sources, baffle members, and detector array provides a structure which utilizes a single array of sensors for providing both plate and film scan information. In addition, the apparatus may be switched by means of a single control which is effective to both shift the baffle members and control energization of the appropriate radiation sources.

What is claimed is:

1. A combination film and plate scanning device for determining the image area of an image member which image area is to be printed, said device comprising:

transparent support means for supporting a plate or film to be scanned, said support means having a viewing area, sensor means for detecting radiation from the plate or film, said sensor means being located above said viewing area, control means including switching means for selectively switching between a plate scan mode and a film scan mode, first radiation means for providing radiation to the film to be scanned at said viewing area on said support means, said first radiation means being located beneath said support means, second radiation means for providing radiation to the plate to be scanned at said viewing area, said second radiation means being located above said support means, means for channeling the light from said second radiation means and directing it an angle to the plate to be scanned at said viewing area, said means for channeling the light including optical baffle means, said optical baffle means including at least two optical baffle members each with edge portions which at least in part define an optical window at said viewing area and through which the radiation detected by said sensor means passes, means for moving at least one of said optical baffle members to change the effective size of said optical window when switching between the plate scan mode and the film scan mode, and said switching means including means for disabling and actuating said first and second radiation means, respectively, when switching between the film scan and plate scan modes, respectively.

2. A combination film and plate scanning device as set forth in claim 1 wherein said second radiation means includes at least two light bulbs, and said means for channeling the light from said second radiation means includes at least two shield members which cooperate with said two optical baffle members to channel the light from the respective light bulbs and direct it at angle to the plate to be scanned.

3. A combination film and plate scanning device as set forth in claim 1 including at least two baffle supports for supporting said two optical baffle members for movement between the plate scan mode and film scan mode, and said moving means includes lever means for moving said two baffle supports to thereby move said optical baffle members between the plate and film scan modes.

4. A combination film and plate scanning device as set forth in claim 3 including means for effecting operation of said lever means to move said optical baffle means between the plate scan and film scan modes, said switching means having means movable in response to operation of said lever means to actuate said switching means.

* * * * *